Figure 1:
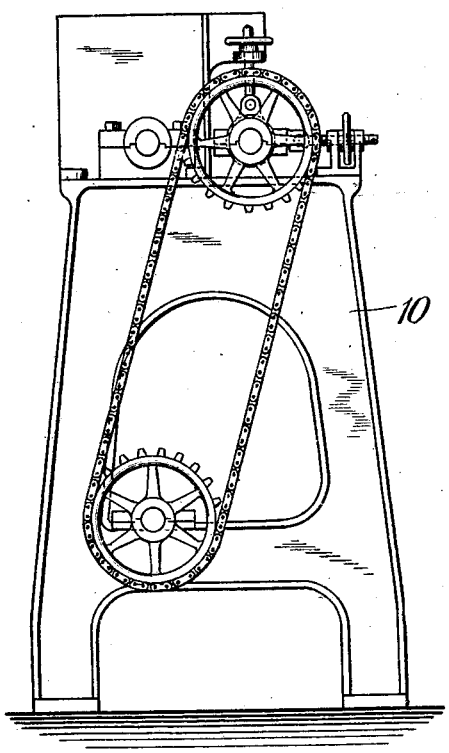

F. T. KENT.
COTTON GIN.
APPLICATION FILED MAY 23, 1908.

923,533.

Patented June 1, 1909.

WITNESSES:
F. S. Andrews Jr
Gus. G. Klinck

INVENTOR
Frederick T. Kent
BY
Chapin & Rayson
his ATTORNEYS

UNITED STATES PATENT OFFICE.

FREDERICK T. KENT, OF BROOKLYN, NEW YORK, ASSIGNOR TO EMPIRE DUPLEX GIN COMPANY, OF NEW YORK, N. Y., A CORPORATION OF ARIZONA TERRITORY.

COTTON-GIN.

No. 923,533.  Specification of Letters Patent.  Patented June 1, 1909.

Application filed May 23, 1908.  Serial No. 434,465.

*To all whom it may concern:*

Be it known that I, FREDERICK T. KENT, a citizen of the United States of America, and a resident of the borough of Brooklyn, county of Kings, State of New York, have invented certain new and useful Improvements in Cotton-Gins, of which the following is a specification, reference being had to the accompanying drawings, forming a part thereof.

My invention relates to improvements in cotton gins, and particularly to an improved form of rotary stripper for employment in a roller cotton gin.

It has been common in the past to employ stripping means in combination with a rotatable roller in a roller cotton gin, which is designed to strip the seeds from the cotton fibers by a blow, or a succession of blows imparted to the seeds lengthwise of the fibers. This method has been successfully employed, but the result has been that where a seed is held very tenaciously by the fibers the act of removing such seed has often resulted in breaking or rupturing the fibers. This is particularly the case where the fibers are crossed in front of the seeds so that the seeds are packed as it were in the fibers.

In my present invention I employ a stripper having stripping devices preferably in the form of pegs, the faces thereof being curved or otherwise arranged at an angle to the seeds, so that the blow given by the stripping device to the seed is in the nature of a glancing one. The tendency is then rather to strike the seed sidewise than to force it in the direction of movement of the stripping device. Then in order to deliver a succession of these glancing blows to the seed I arrange the pegs, or other stripping elements, spirally around the periphery of the part carrying them, so disposing them that the extreme lateral portion of each peg upon one side thereof is directly in line with the extreme lateral portion of the immediately succeeding peg at the opposite side of the same. The result of this is that, if any one peg in striking a glancing blow to a seed knocks the seeds slightly sidewise, the said seed will be in a line to be struck again by the next peg, whereby a series of rapidly succeeding glancing blows will be delivered to the seeds to work them away from the fibers rather than to suddenly expel them by direct force. It may sometimes happen that a particularly obstinate seed will be struck a number of such glancing blows so as to be worked backward and forward until finally it is released, but in so releasing the seed it will be readily understood that the tendency to break or rupture the fibers of the cotton is reduced to a minimum.

In order that my invention may be thoroughly understood, I will now proceed to describe an embodiment thereof having reference to the accompanying drawings illustrating the same, and will then point out the novel features in claims.

Figure 2:
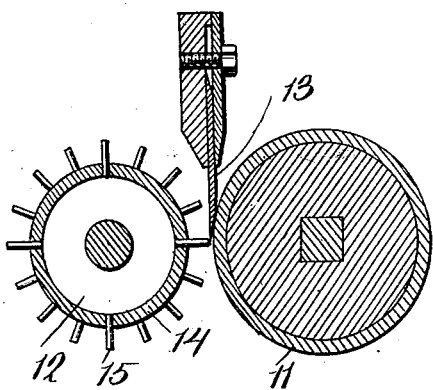
Figure 3:
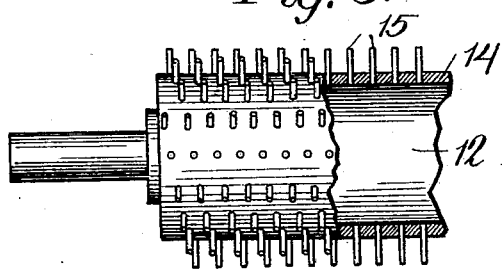
Figure 4:
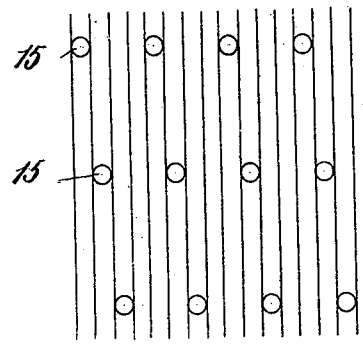

In the drawings: Figure 1 is an end view of a cotton gin embodying this invention. Fig. 2 is a view in transverse vertical section through the working parts of the gin. Fig. 3 is a detail view in side elevation of a portion of the stripping member removed from the gin. Fig. 4 is a diagrammatic view illustrating the relative positions of the stripping elements with respect to each other.

The gin illustrated comprises a suitable frame work 10, a ginning roller 11, and a rotatable stripping member 12 suitably journaled therein, and a stationary bed knife 13 secured to the frame work and arranged for co-action with the said roller and stripping member. The stripping member comprises a suitable body portion 14, here shown as in the form of a cylinder, and a plurality of radially disposed pegs. The pegs are here shown in the form of cylindrical pins which are disposed spirally around the circumference of the cylindrical body portion 14, the extreme lateral portions of each pin upon either side thereof being arranged immediately in line with the extreme lateral portions of succeeding and preceding pins upon relatively opposite sides of the same. The particular arrangement will be readily understood by reference to Figs. 3 and 4 of the drawings. In the diagrammatic view Fig. 4 the vertical lines are imaginary ones illustrating the fact that the right hand side of one pin is immediately in line with the left hand side of the next succeeding pin. The ends of the pins are arranged for co-action with the periphery of the ginning roller and also with the edge of the bed knife, the latter being arranged substantially tangent with respect to the peripheries of the said ginning roller and stripping member. It will be readily understood that in operation the rounded face of a pin will be the face which will strike the seed, and that the result of this will be to strike a glancing blow upon the seed rather than a direct blow. The tendency will be then to force the seed sidewise in the direction of succeeding pins, the arrangement of the pins being such that there is no point along the whole stripping member in which, during its rotation, a seed will not be struck at least once and preferably many times more than once. Thus, the seed will receive a series of glancing blows sometimes in one direction and sometimes in the other in accordance with from which side of the center of a pin the seed happens to receive the blow, whereby the seed will be gradually worked out of its position among the fibers rather than to be expelled suddenly and with force therefrom as has been common heretofore.

It will, of course, be understood that the stripping elements, herein shown as cylindrical pins, might be of other forms so long as the advancing face of the said elements is designed to impart a glancing blow to the seeds.

The stripping elements, herein shown as cylindrical pins, are preferably quite small in diameter so that the movement imparted to the seed at one time, by any one peg, is, or may be, quite small. In practice I have found that the diameter of the pins may be conveniently considerably less than the average width of a seed. The pins in any one row should be of ample width apart to freely permit the seeds to pass through them, because after the seed has been struck by one pin it is intended that it shall not be struck again until a pin of the next succeeding row strikes it.

What I claim is:

1. In a roller cotton gin, the combination with a roller and a stationary bed knife, of a rotatable stripping member for co-action therewith comprising a plurality of radially disposed stripping elements whose faces are arranged oblique to the axis of rotation thereof, the said elements being disposed spirally around the axis of their member and with the extreme lateral portion of one stripping element upon one side thereof substantially in a line with the extreme lateral portion of the succeeding stripping element upon the opposite side of the same, whereby no space is left between them in the said direction of rotation.

2. In a roller cotton gin, the combination with a ginning roller and a stationary bed knife, of a rotatable stripping member for co-action therewith comprising a body portion and a plurality of radial cylindrical pins spirally disposed around the same, the extreme lateral portions of pins which succeed each other in the direction of rotation of the member being substantially in a line with each other upon their opposite sides.

FREDERICK T. KENT.

Witnesses:
D. HOWARD HAYWOOD,
LYMAN S. ANDREWS, Jr.